(12) United States Patent
Kuoksa

(10) Patent No.: US 7,919,067 B2
(45) Date of Patent: Apr. 5, 2011

(54) METHOD AND APPARATUS FOR CONTROLLING A CAUSTICIZING PROCESS

(75) Inventor: Hannu Kuoksa, Tampere (FI)

(73) Assignee: Metso Automation Oy, Helsinki (FI)

( * ) Notice: Subject to any disclaimer, the term of this patent is extended or adjusted under 35 U.S.C. 154(b) by 0 days.

(21) Appl. No.: 10/003,574

(22) Filed: Oct. 24, 2001

(65) Prior Publication Data

US 2002/0119083 A1  Aug. 29, 2002

Related U.S. Application Data

(63) Continuation of application No. PCT/FI00/00489, filed on May 31, 2000.

(30) Foreign Application Priority Data

May 31, 1999 (FI) .......................... 991233

(51) Int. Cl.
*C01F 11/18* (2006.01)
(52) U.S. Cl. .......................... 423/432; 162/49
(58) Field of Classification Search .................. 423/432; 162/49
See application file for complete search history.

(56) References Cited

U.S. PATENT DOCUMENTS

| | | | |
|---|---|---|---|
| 4,236,960 A | 12/1980 | Hultman et al. | |
| 4,311,666 A | 1/1982 | Hultman et al. | |
| 4,536,253 A | 8/1985 | Bertelsen | |
| 4,762,590 A * | 8/1988 | Engdahl | 162/30.11 |
| 5,213,663 A * | 5/1993 | Musow | 162/49 |
| 5,378,320 A | 1/1995 | Leclerc et al. | |
| 5,616,214 A | 4/1997 | Leclerc | |
| 5,822,220 A * | 10/1998 | Baines | 700/266 |

FOREIGN PATENT DOCUMENTS

| | | |
|---|---|---|
| CA | 1 198 558 | 12/1985 |
| CA | 2 074 347 | 1/1993 |
| EP | 0 524 743 A1 | 1/1993 |
| FI | 76137 | 9/1982 |
| FI | 66662 | 11/1984 |
| WO | WO 98/10137 | 3/1998 |

OTHER PUBLICATIONS

International Search Report, Oct. 18, 2000.
Finnish Official Action, Dec. 1, 1999.
Canadian Office Action for No. 2,374,907 dated Nov. 16, 2007.
Puhakka, J. et al., "On-line alkali measurement and control of the causticizing process," *31st Pulp and Paper Annual Meeting*, Oct. 19-23, 1998, pp. 705-711.
European Search Report dated Aug. 16, 2010 for EP Application No. 00 929 599.9.
Swanda, Anthony P., et al; Dynamic models of the causticizing process;Tappi Journal; vol. 80; No. 12; Dec. 1997; pp. 123-134.
Wang, Lijun; Dynamic Simulation of a Recausticizing Plant; MSc Thesis, University of British Columbia; Feb. 1993; 108 sheets.
Technical Book Y-214, Preparation of White Liquor, Swedish Forest Industries Federation 1985, ISBN 91-7322-086-8.
Finnish Opposition against parent Finnish Patent No. 114813.

* cited by examiner

*Primary Examiner* — Stuart Hendrickson
(74) *Attorney, Agent, or Firm* — Alston & Bird LLP

(57) ABSTRACT

A method and an apparatus for controlling a causticizing process, the process comprising slaking, causticizing and white liquor preparation. The slaking is carried out using a slaker into which green liquor and lime is fed to produce lime milk. The causticizing process is controlled by applying a model that describes at least a part of the causticizing process.

13 Claims, 6 Drawing Sheets

METHOD AND APPARATUS FOR CONTROLLING A CAUSTICIZING PROCESS

CROSS-REFERENCE TO RELATED APPLICATION

This application is a Continuation of International Application PCT/FI00/00489 filed on May 31, 2000, which designated the U.S. and was published under PCT Article 21(2) in English, and which is incorporated herein by reference.

FIELD OF THE INVENTION

The invention relates to a method for controlling a causticizing process which comprises slaking, causticizing and the preparation of white liquor, the slaking being carried out using a slaker into which green liquor and lime are fed to produce lime milk.

The invention further relates to an apparatus for controlling the causticizing process which comprises slaking, causticizing and the preparation of white liquor, the slaking taking place in a slaker into which green liquor and lime are arranged to be fed to produce lime milk.

BACKGROUND OF THE INVENTION

The aim in causticizing is to react lime exiting a lime sludge reburning kiln with green liquor exiting a soda recovery boiler in appropriate circumstances and in a suitable mixture ratio to produce white liquor of a desired quality and lime mud, i.e. calcium carbonate $CaCO_3$. The causticizing process can be divided into three phases: slaking, causticizing and white liquor preparation. The most important phase in the process is the feeding of lime into the slaker/screening unit where the lime is slaked, and the causticizing reaction begins. The causticizing process is therefore typically controlled by controlling the operation of the slaker, which is currently based on controlling the lime to green liquor ratio and the difference between the temperature in the slaker and that of the green liquor. The ratio control aims at maintaining a correct lime feed level in all circumstances, and the temperature difference control is used to compensating for changes in lime quality or quantity by changing their ratio as the temperature difference changes. This is based on the exothermicity of the slaking reaction: changes in lime quality or quantity are manifested by changes in the temperature difference between the slaker and the green liquor entering the slaker. However, the ratio or the temperature difference does not tell the real state of the process.

Various automated titrators have been used to further improve the control. A titrator provides reliable information about the composition of green liquor and lime milk at intervals of about 10 minutes. The results allow the settings of the temperature difference control and the ratio control to be changed to obtain optimal end product quality. The most commonly used variable in the control is white liquor causticity, i.e. conversion of sodium carbonate to sodium hydroxide, which is an active compound in pulping.

The ratio control is a rough adjustment connected to operate in a feedforward manner with respect to a green liquor flow rate controller. In some control solutions, analysis results provided by the automated titrator are applied to directly influence the set value of the ratio control on the basis of a mathematical formula that takes into account aspects such as the causticity prevailing after the slaker and the last causticizing vessel, green liquor quality, etc. The change in the set value of the ratio control is always calculated after the titration has been completed.

Temperature difference control arranged in addition to ratio control provides an end product of a more uniform quality, because in a short run changes in lime quality or quantity can be corrected by influencing the ratio control. An automated titrator and a temperature difference control allow a discontinuous absolute measurement to be combined with continuous relative measurement. In previous solutions attempts have been made to apply a mathematical formula to the results provided by the titrator and the measurements of green liquor and the slaker to calculate a suitable temperature difference change that would allow a desired lime milk causticity and/or white liquor causticity to be obtained after the slaker. The change with respect to the set value of the temperature difference is always calculated after the titration has been completed. A common aspect of these known control methods is that the causticizing degree achieved after the slaker is kept constant during the entire control process.

However, a major problem in the slaker control is the variations taking place in the green liquor temperature and density despite the control. Changes in green liquor density, and thereby in the total titratable alkali TTA, as well as temperature changes cause disturbances in the slaker control. A change in the TTA affects the chemical balance of the causticizing process directly; it changes the kinetics of the process and, together with sulphidity, it determines at the same time a theoretical maximum for causticity. Temperature changes in green liquor distort the information supplied to temperature difference control, because in the slaker temperature the changes appear both as delayed and filtered. In other words, they are incorrectly manifested as quality changes to the temperature difference control.

Sometimes the physical and chemical quality of lime is such that despite the temperature difference control and a uniform lime feed, great fluctuations appear in temperature differences and, thereby, in causticities. Changes in lime quality emerge in the lime sludge reburning kiln, or when lime mud is fed into a lime silo. Production changes, raw material variations, mechanical disturbances, etc., affecting the lime sludge reburning kiln change the granular size of lime and both its physical and chemical structure, which in turn changes its slaking properties, caustic efficiency and flow properties. The degree of filling of the lime silo affects the packing, temperature and behaviour of lime in the feed screw. When all the lime has been spent, or fresh, reactive lime is introduced, the temperature difference in the slaker and the causticities change radically in a short period of time.

Problems also arise from lime feed: for example, the scaffolding of the silo and the wearing of the feed screw cause disturbances in lime feed which cannot be corrected with conventional methods, either due to lack of time or efficiency. Wearing of and disturbances in the lime feed equipment, as well as changes in lime quality, cause instability, disturbances and hysteresis in the control settings which is shown in that the change in the temperature difference in response to a change in the lime to green liquor ratio is delayed. The delay, in turn, causes oscillation in the control, thereby degrading the quality of the end product.

Problems are also caused by the interval of automated titrations; the minimum interval is 10 minutes and, in practice, the interval for the most significant measurements is over 20 minutes. In addition, the completion of the titration after the sampling takes several minutes. Long titration intervals retard the total control process because the temperature difference control settings can only be changed after the titration is completed.

Further problems are caused by process delays. For example, the minimum time from the lime feed to the titration taking place after the slaker is half an hour, the titration performed after the last causticizing vessel consuming typically 3 to 4 hours. Delays are known to cause problems of control, because the longer the time from the measured disturbances and changes, the more difficult it is to influence them.

Long and changing delays, changes in green liquor quality and in lime quality and quantity make it almost impossible to use both the causticity after the slaker and that after the last causticizing vessel for active control. Known methods have attempted to take into account measured and titrated variable values and changes in them when calculating changes in either the temperature difference control or the ratio control.

A basic problem involved in a control system employing a titrator and based on the ratio control alone is that it does not take into account changes taking place between the titrations at all. Depending on the condition of the titrator, measurements have to be filtered, or even rejected, if they deviate too much from the previous titrations. Nevertheless, it is not certain whether an individual result is a real one or whether it includes a deviation caused by process conditions or the titrator. Moreover, the control process must be made slow, because great variations in set values cause a discretely adjusted process to oscillate easily. Since the process is affected by transit time delays and measurement delays, a discrete control employed alone will ultimately lead to a situation where the measurement deviates from the set value to such an extent that the correction is either too slow, or it causes the process to oscillate on both sides of the set value. In both cases, quality is impaired and production is lost due to low causticity or the blocking of the white liquor filter. In addition to this, the observations relating to lime feed and causticity restrictions described below are valid.

In applications employing a titrator and based on temperature difference, the discreteness of control has been eliminated because the temperature difference shows even major changes taking place at short intervals quickly and in real-time. There are still a few aspects that have not been taken into account in known solutions, for example problems related to lime feed and the correlation between production phase and causticities. Furthermore, these solutions lack the actual dynamics that allow the control system to be active almost in every situation without the operator being required to intervene in the set values or the state of the control system. One example is applications where the causticity set value must be changed every time production changes.

WO publication 98/10137 discloses a solution for controlling the causticizing process by calculating the causticizing degree to control lime feed. The proportions of the different green and white liquor components are measured, and the causticizing process is controlled using for example a neural network or fuzzy logic. The solution is fairly complex and does not produce a sufficiently good end result for the control in all respects.

U.S. Pat. No. 5,378,320 discloses a solution where samples are taken from the causticizing process, the properties of the samples being determined by applying infrared spectrophotometry. The measurement results are used for controlling the amount of lime. Also this solution does not provide a sufficiently good causticizing process control in all respects.

FI Patent 66,662 discloses a solution for controlling the causticizing degree by taking samples from the liquid (white liquor) exiting the slaker and the liquid (green liquor) fed to the slaker. The causticizing degree is controlled on the basis of the carbonate-ion content of these samples. The carbonate-ion contents are determined using a specific analyzer where the carbonate included in the sample is converted to carbon dioxide, the amount of which is then measured. This allows the amount of carbonate included in the sample to be concluded and, thereby, the amount of calcium oxide to be added to the causticizing process to be controlled. The patent also describes factory tests where the concentration of the green liquor, i.e. its carbonate content, is first monitored by applying density determination to provide comparison data, then calcium oxide is added, and finally the above mentioned analyzer is used for determining the carbonate-ion contents of both the green and the white liquor. The amount of calcium oxide added is controlled on the basis of the measured carbonate-ion contents, which allows the desired causticizing degree to be achieved. However, all in all the solution of the invention does not allow the causticizing process to be controlled in a satisfactory manner.

FI Patent 76,137 discloses a method for controlling white liquor properties by measuring the electrical conductivity of green liquor and by determining a TTA value for example by measuring the specific weight, or the absorption of gamma radiation, of the green liquor. The use of an electrical conductivity meter involves several drawbacks. For example, the measurement of electrical conductivity is often very inaccurate because temperature and electrical and other disturbances affect the measurement result to a considerable extent. Furthermore, the equipment must be calibrated quite often. Therefore, also in this case the causticizing process cannot be controlled in an entirely satisfactory manner.

It is an object of the present invention to provide a method and an apparatus for eliminating at least some of the above problems.

SUMMARY OF THE INVENTION

The method of the invention is characterized in that the causticizing process is controlled by applying a model that describes at least a part of the process.

The apparatus of the invention is characterized in that the apparatus comprises means for controlling the causticizing process by applying a model that describes at least a part of the process.

An essential idea of the invention is that the causticizing process is controlled by applying a model that describes at least a part of the process. According to a preferred embodiment of the invention, green liquor density is controlled on the basis of a total titratable alkali, or TTA, obtained from an alkali analyzer. The TTA is used for calculating a target value for density by applying an offset determined by means of the model. Another preferred embodiment is based on the idea that the slaker is controlled on the basis of the temperature difference between the slaker and the green liquor in such a way that the set value for the temperature difference control is corrected on the basis of the difference between the target causticity for lime milk and the titration. The lime milk causticity target is the difference between white liquor causticity and a production-dependent variable, the difference being derived employing a model that provides values changing according to situation. A third embodiment is based on the idea that the lime to green liquor ratio is controlled in such a way that the ratio is corrected using the temperature difference control. When the temperature difference deviates from the target, the ratio target is corrected to the opposite direction. A fourth embodiment is based on the idea that when production changes, the lime to green liquor ratio is changed on the basis of the model.

An advantage of the invention is that the causticizing process produces a white liquor quality required by the digester which is more uniform than before, and that the process is self-tuning. In addition, the invention allows for automated start-up, and the white liquor causticity target can be determined automatically or manually. Moreover, the process is able to identify certain disturbances, make the necessary corrections and produce notifications and alarms. A further advantage is that the boiling of the slaker and excess lime application can be prevented. The process methods applied in different work shifts at the plant can be harmonized and also changes can be kept well under control. At the same time, the quality of lime mud can be improved, which in turn improves the operation of the lime sludge reburning kiln. By controlling of the green liquor density, a uniform green liquor quality is ensured. The direct green liquor density control according to the invention is very easy to implement. In a short run, density correlates extremely well with the total titratable alkali, i.e. the direction of the density change shows the direction of change of the total titratable alkali and the measuring of the TTA, for example, allows the density value to be directly obtained. Furthermore, the meter used in the density measurement is significantly more reliable and stable than a meter used for measuring electrical conductivity. A density meter is also easier to use: for example, it does not need to be calibrated often, about twice a year is sufficient.

BRIEF DESCRIPTION OF THE DRAWINGS

The invention will be described in greater detail with reference to the accompanying drawings, in which.

DETAILED DESCRIPTION OF THE INVENTION

Figure 1:
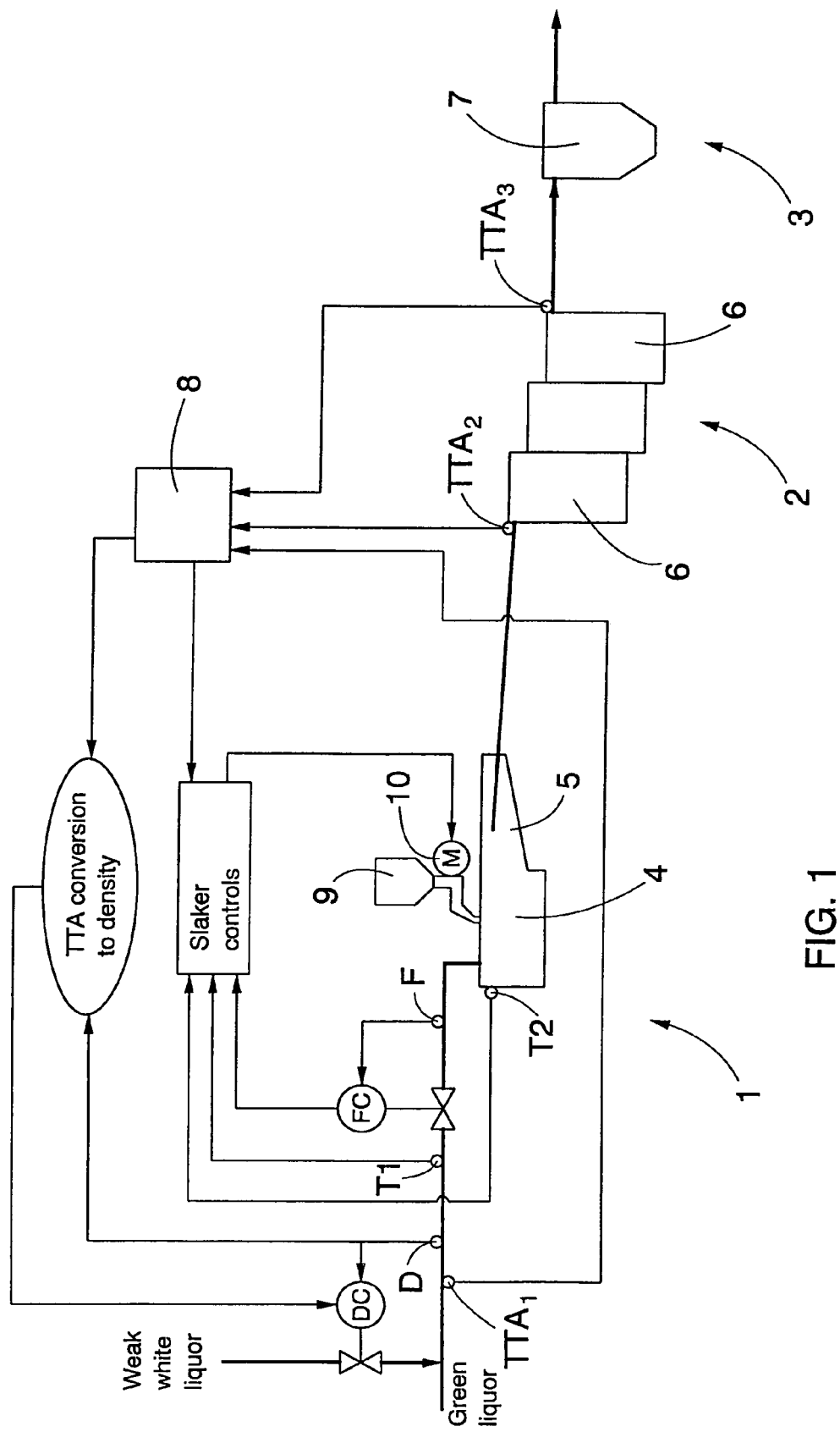
FIG. 1 is a schematic view of a causticizing process and a control solution of the invention used in the process.

The causticizing process can be divided into slaking 1, causticizing 2 and white liquor preparation 3. In the slaking green liquor and lime, i.e. calcium oxide CaO, is fed to a slaker 4 from a lime container 9 to produce lime milk. In lime slaking, calcium oxide CaO is reacted with hot water $H_2O$ contained in the green liquor to produce calcium hydroxide $Ca(OH)_2$ and heat. The reaction can be expressed by the following formula:

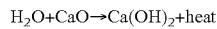

$$H_2O + CaO \rightarrow Ca(OH)_2 + heat$$

The slaker 4 and a screening unit 5 are interconnected by openings through which the lime milk flows into the screening unit 5. In the screening unit 5 the lime milk is mixed with green liquor fed directly to the screening unit, as a result of which sand and quick lime are separated from the lime milk and impurities fall down on the bottom of the screening unit 5. The screening unit 5 mechanism moves the deposit upward from the bottom, and lime milk flows to causticizing 2.

The causticizing 2 is a process where hydrated lime $Ca(OH)_2$ is reacted with sodium carbonate $Na_2CO_3$ contained in the green liquor to produce sodium hydroxide NaOH and lime mud, or calcium carbonate $CaCO_3$. The reaction can be expressed by the following formula:

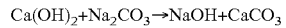

$$Ca(OH)_2 + Na_2CO_3 \rightarrow NaOH + CaCO_3$$

The causticizing reaction is immediately activated when calcium hydroxide is generated in the slaking, and the reaction continues until it has reached a specific balance. It takes some time, a few days even, before the balance is reached. In industrial scale, it is sufficient to dimension the causticizing containers 6 for a delay of 1.5 to 3.0 h, depending on the method of preparing the white liquor. The aim is to obtain a causticizing degree of over 80% in the white liquor produced. The causticizing reaction takes place primarily in serially connected causticizing containers 6. The causticizing containers 6 are provided with a mixer that prevents the lime mud from falling down. In the causticizing 2, lime milk flows from the screening unit 5 to a first causticizing container 6, then to a next one, etc. There are typically three causticizing containers 6. From the last causticizing container 6, the lime milk flows to a white liquor preparing process 3.

In the white liquor preparing process 3, lime mud is separated from water and alkali dissolved in the water at a temperature of more than +70° C. The lime mud can be separated from the white liquor mechanically, for example by clarifying or in a filter 7. The causticizing process is fully known per se to a person skilled in the art, and therefore it is not described in greater detail in this context.

FIG. 1 shows the control of green liquor density by applying the invention. In the Figure, the slaker controls are described by reference only, more detailed description of the controls being given in connection with FIG. 4. Green liquor density D is controlled by means of a density controller DC which is used to control the amount of weak white liquor to be fed into the green liquor. Furthermore, the green liquor density is controlled on the basis of the total titratable alkali TTA. The total titratable alkali TTA is the sum of all titratable sodium compounds, i.e. sodium carbonate $NaCO_3$, sodium hydroxide NaOH and sodium sulphide NaS. An alkali analyzer 8 measures the TTA of the green liquor, i.e. $TTA_1$, the TTA of the lime milk prior to the causticizing 2, i.e. $TTA_2$ and the TTA of the lime milk after the causticizing 2, i.e. $TTA_3$. The TTA can also be arrived at by calculation based on another measurement, such as the measurement of conductivity.

Figure 2:
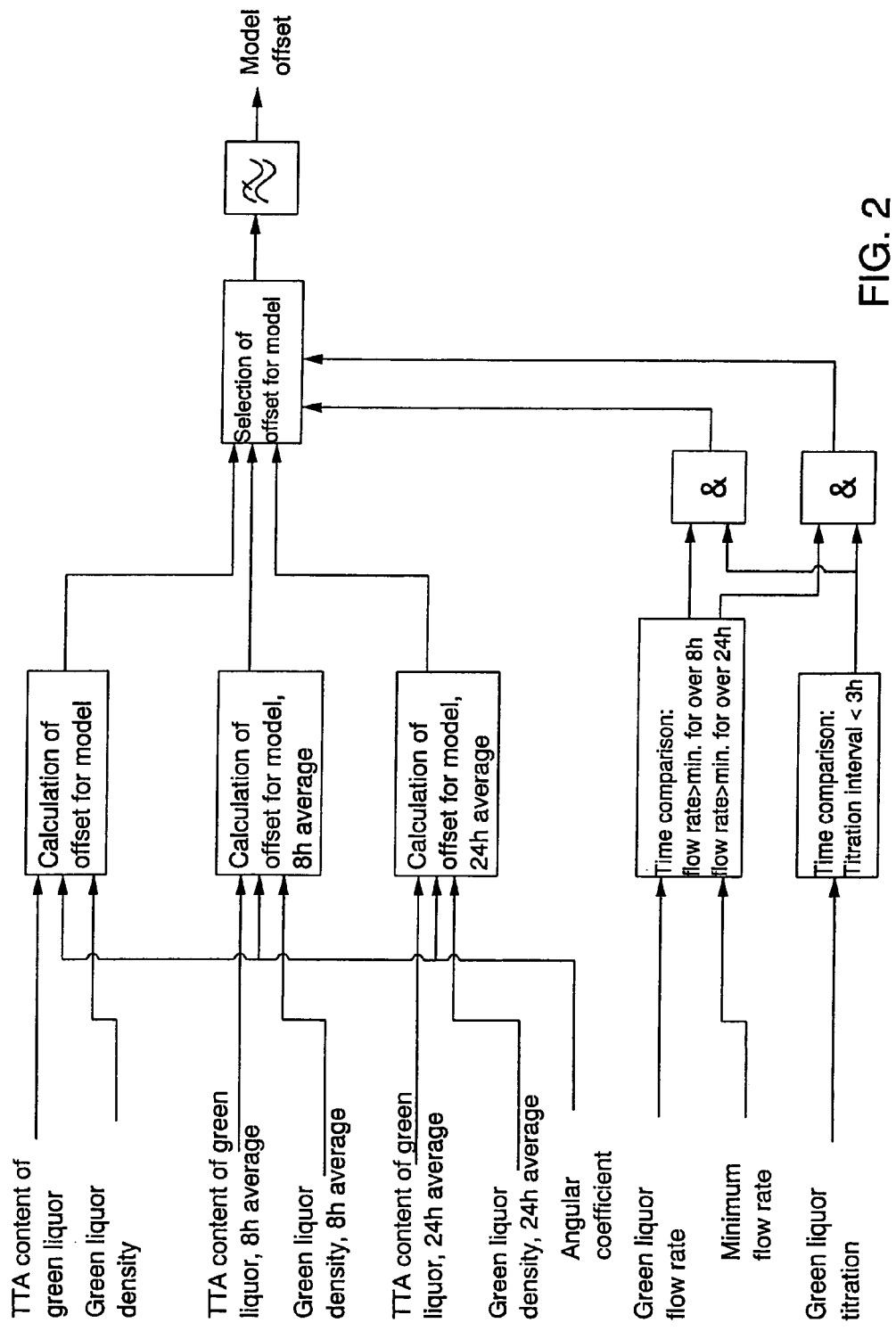
FIG. 2 is a diagram showing the calculation of an offset used when converting TTA to density.

The target TTA values are used to calculate a set value for density by means of a model. The model is calculated using momentary values of the TTA and density, or average values of a longer period, such as 8 or 24 hours, depending on the state of the process and the titrator. In other words, green liquor density D is controlled on the basis of the TTA obtained from the alkali analyzer 8. For example, at the start-up of a specific causticizing line, or when an automation module is for some reason updated, the value for the density D is always stored when a new green liquor titration is completed. The green liquor TTA and the momentary density are used for calculating an offset which is applied when density is converted to TTA and vice versa. The calculation of the offset is shown in the diagram of FIG. 2. When a sufficient flow and regular titrations have been obtained for example for 8 hours, 8-hour averages of the variables concerned are applied in model. Similarly, when a sufficient flow and regular titrations have been obtained for example for 24 hours, 24-hour averages of the variables concerned are applied in model. These times serve only as examples, averages of any other time from 1 to 40 hours, for example, being equally well applicable in the model.

Depending on the titration sequence of the alkali analyzer 8, for example 1 to 20 TTA analysis results, typically 2 to 4, are obtained during a plant work shift. The offset is calculated on the basis of a longer period of time, such as 1 to 40 hours, for example for 8 or 24 hours, and it is continuously updated. The offset is used for calculating a continuous TTA based on a continuous, filtered density measurement value. The following formula is used for converting density to TTA:

$$TTA = kk*D - os,$$

where TTA is the green liquor total alkali;
kk is an angular coefficient;
D is the green liquor density; and
os is the calculated offset.

TTA is converted to density correspondingly, by applying the following formula:

$$D = (TTA + os)/kk.$$

The model employs a constant angular coefficient kk, the value of which is between 0.9 and 1.4, provided that the unit used to express the TTA and the density is the same (such as g./lit.). The most preferred value of the angular coefficient kk is about 1.12. When different units of measurement are used, the angular coefficient kk naturally changes accordingly, and it is provided with a value other than zero.

Figure 3:
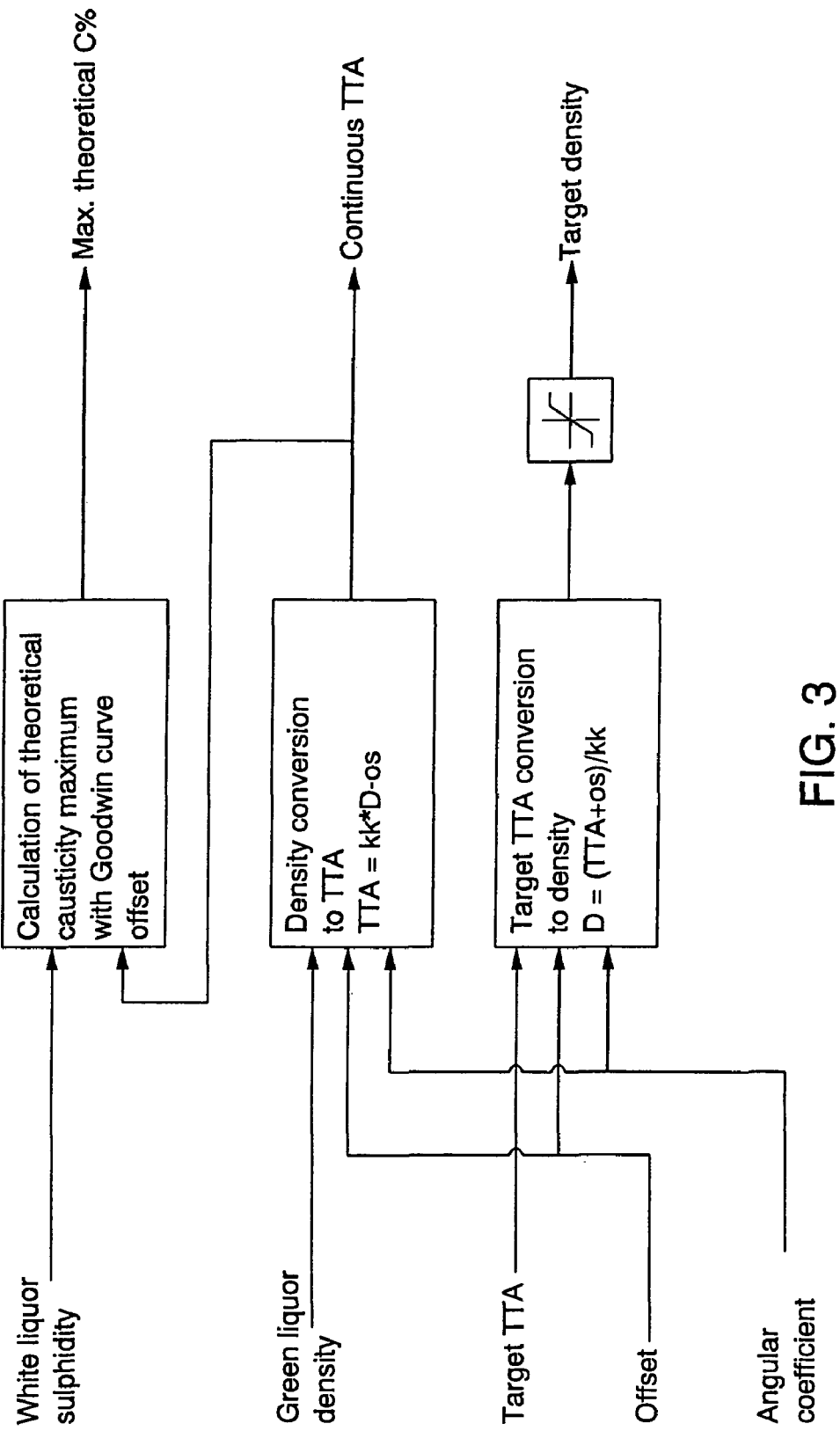
FIG. 3 is a diagram illustrating the use of the offset calculated as shown in FIG. 2.

FIG. 3 shows how the described offset is used for calculating a target density, continuous TTA and theoretical causticity maximum. FIG. 3 also shows how the TTA control operates. The control is implemented by setting a target value to the TTA which is then converted to a set value for density. A continuous TTA value is arrived at by means of the green liquor density D, offset os and angular coefficient kk. On the basis of the model and white liquor sulphidity, a maximum theoretical causticity can be calculated by applying a Goodwin curve offset, for example.

Causticity percentage C % illustrates the ratio of hydrated calcium carbonate to a total calcium carbonate participating in the reaction, and it can be expressed using the following formula:

$$C\% = \frac{NaOH}{NaOH + Na_2CO_3} * 100$$

Figure 4:
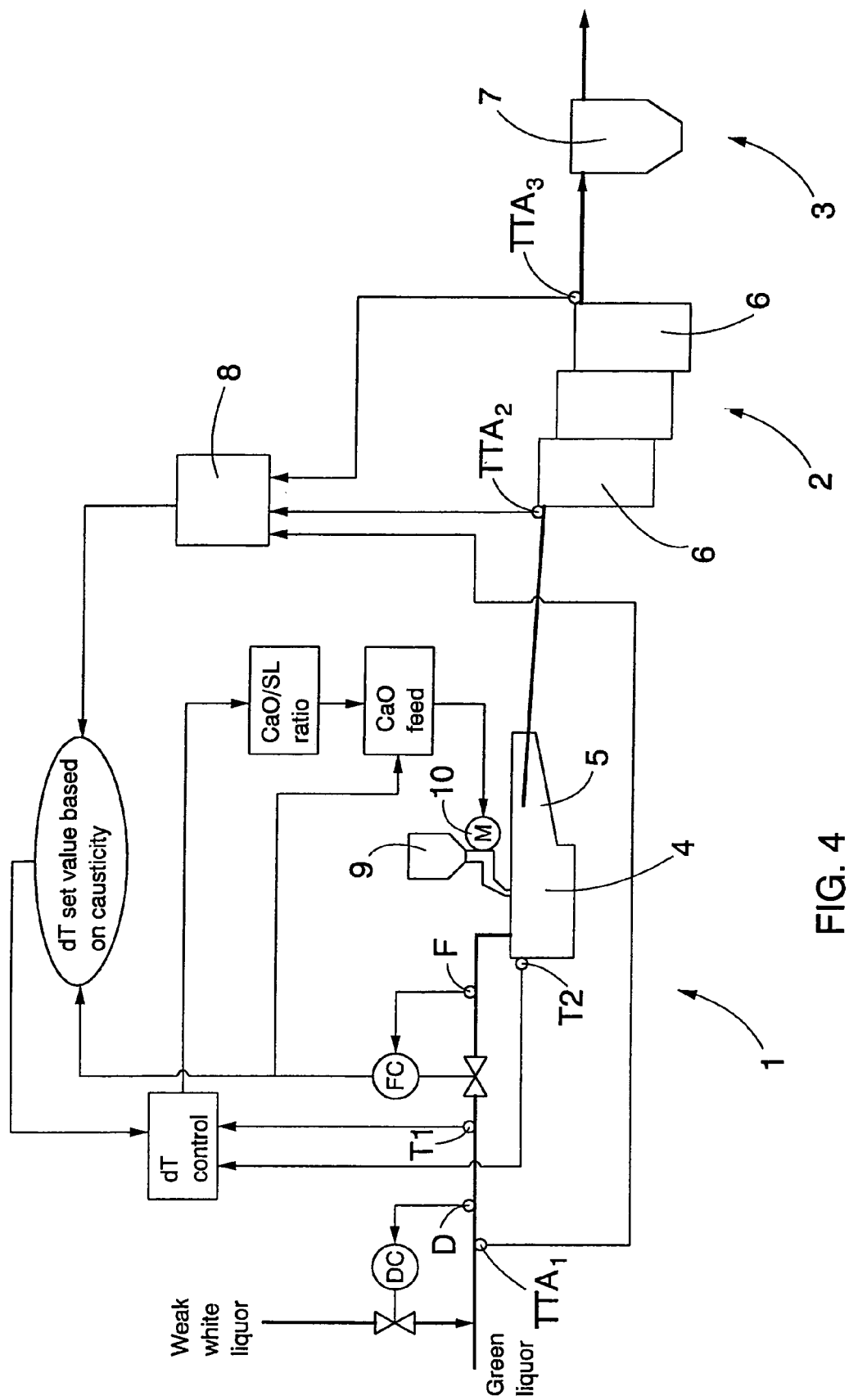
FIG. 4 is a schematic view of the causticizing process and another control solution of the invention used in the process.
Figure 5:
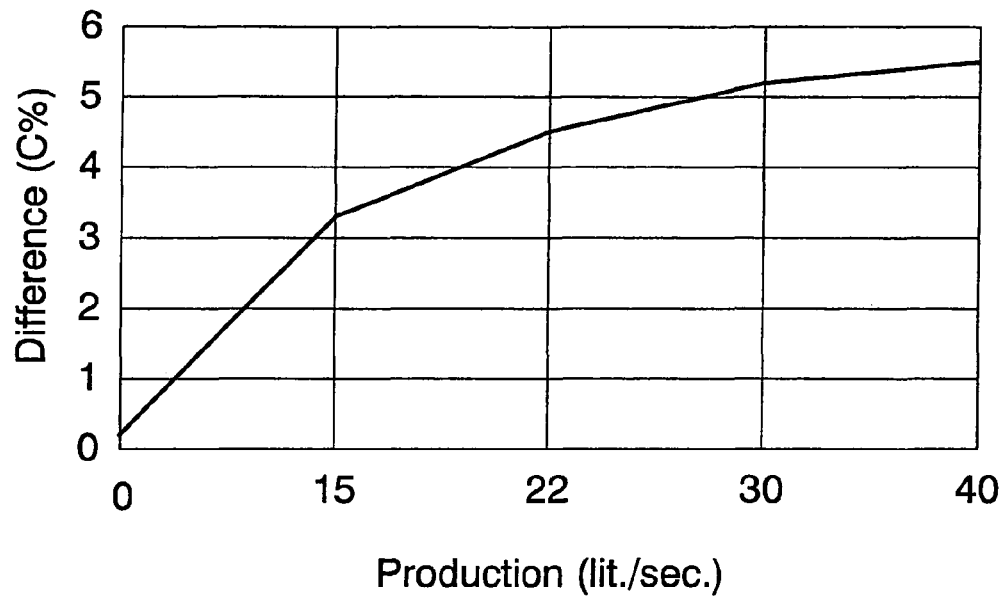
FIG. 5 is a curve illustrating a static model of a causticizing difference.

FIG. 4 shows the causticizing process and a more detailed view of the slaker control of the invention implemented with the alkali analyzer 8. For the temperature difference control, green liquor temperature T1 and slaker temperature T2 are measured, the difference between the temperatures being then used for controlling the lime to green liquor ratio CaO/SL by regulating the lime feed using means 10 to adjust the amount of lime fed. The set value for the temperature difference control is corrected on the basis of the difference between the causticity target of a filtered or averaged lime milk and the causticity titration or titrations. The causticity target of lime milk primarily depends on the production level and the set value for the white liquor causticity and the white liquor titrations. The set value for the white liquor causticity is determined by the operator, the production phase determining the difference between the white liquor causticity and that of lime milk. Consequently, the actual lime milk causticity target is provided by the difference between white liquor causticity and a production-dependent variable. The difference is obtained on the basis of a production-line-specifically tuned model. FIG. 5 illustrates a curve of a preferred example of a static causticity difference model. The static model in question describes the development of the causticity prevailing after the slaker to white liquor causticity. Green liquor flow F is controlled by means of a flow controller FC, information for determining the set value for the temperature difference of causticity and for lime feed being supplied from the controller. The target causticity value for white liquor and the production level together determine the causticity target for lime milk. The white liquor causticity is used for correcting the final causticity at the appropriate level. The temperature difference target is corrected using the causticity difference of lime milk.

Figure 6:
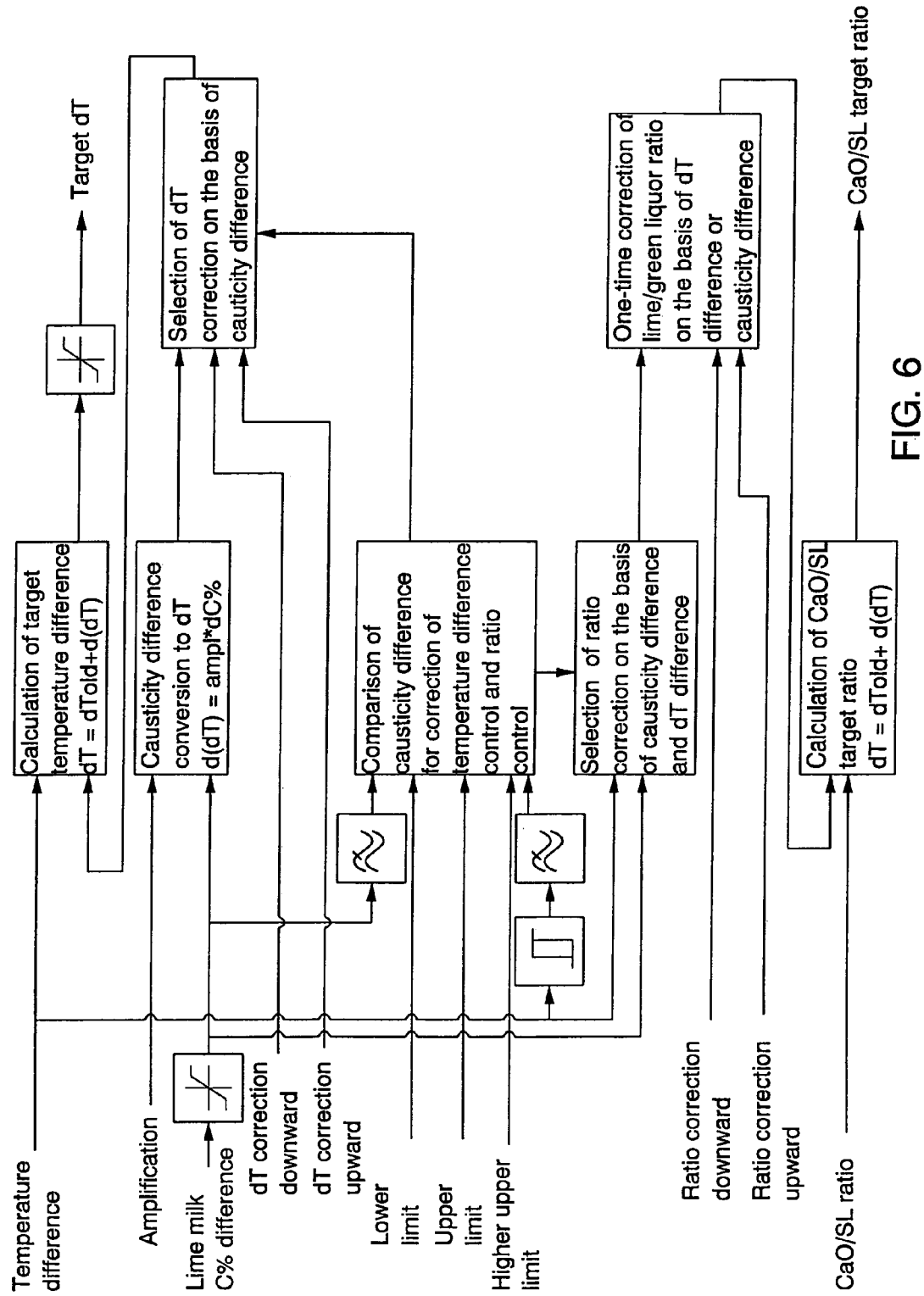
FIG. 6 is a diagram illustrating the correction of the target values for temperature difference control and ratio control.

The static model for causticity difference is corrected dynamically by calculating a quotient of an average of the differences in white liquor and lime milk causticities and a difference provided by the above described model on the basis of the production average. The quotient thus obtained is multiplied by a difference provided by the model, a set value better corresponding to the prevailing situation being thereby obtained. This aims at making the white liquor causticity average correspond to the target. The correction coefficient is calculated on the basis of averages of a longer time period, such as 2 to 40 hours, for example for 8 or 24 hours, depending on how long the green liquor flow has been sufficient and the time elapsed from the previous titration. Minimum and maximum values are set for the correction. A correction to be made to the temperature difference is calculated on the basis of the difference between the filtered or averaged lime milk causticity target and the result of the analysis. The difference is filtered and multiplied by a fixed parameter, the result being then summed with the temperature difference target, provided that certain process- and status-related conditions are fulfilled. Such conditions include "titrator control on", "lime milk titration completed", "titration value within acceptable range", "change to previous within acceptable range", "ratio of delayed and filtered temperature difference value to causticity difference within predetermined range". Some of the conditions are shown in FIG. 6. The target value for temperature difference control is limited to a minimum of 0° C. and maximum of 0.5° C. below the theoretical boiling point of the slaker. Another way to implement the above described model dynamically is to compare the causticities of white liquor and lime milk directly.

The lime to green liquor ratio, or CaO/SL, is corrected by means of the temperature difference control. This requires that the slaker is controlled using both the CaO to SL ratio and the temperature difference. When the temperature difference deviates from the target, the ratio target is corrected into the opposite direction. When desired, the control of the CaO to SL ratio can also be designed in such a way that the temperature difference control is bypassed.

The titration results obtained from the alkali analyzer 8 are used for changing the set value for the temperature difference, and also directly for correcting the set value for the ratio control. The CaO to SL ratio is acted on when a production change takes place and when the lime milk causticity or the temperature difference is outside the acceptable range.

Changes in production change delays as well, and this has to be taken into account by changing the lime to green liquor ratio. This allows the correct causticity range to be achieved quicker. When production changes, the ratio is changed accordingly with the aim of obtaining a lime feed change which is equal to the relative change in the green liquor flow.

Figure 7:
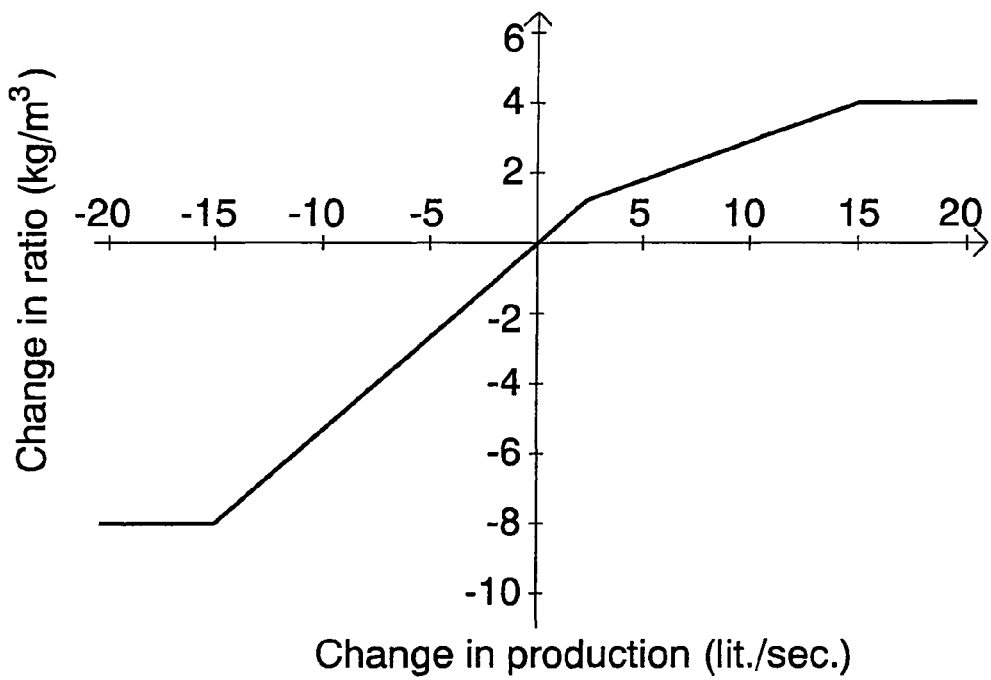
FIG. 7 illustrates a static model of a change in lime to green liquor ratio in a situation where production changes.

The model for the ratio change in connection with a production change is illustrated by a curve shown in FIG. 7.

The difference between the lime milk causticity titration and the target causticity changes the lime to green liquor ratio to the opposite direction. When the difference exceeds the acceptable upper limit, a downward change proportional to the difference and bigger than previously is introduced in the ratio control setting so as to avoid excess lime application. When the difference is below the lower limit, the setting is corrected upward, although applying a smaller coefficient than in the opposite situation. Another way of filtering the titration is to accept control values appearing in a causticity range where the lower limit is constant and the upper limit exceeds the target by for example 2.5 causticity %. In addition, the lime to green liquor ratio is always reduced by a constant amount when two successive titrations have exceeded the upper acceptable limit when the control has been on. This principle is shown in FIG. 6.

When the temperature difference deviates from the target too much, the lime to green liquor ratio will be acted on, bypassing the temperature difference controller. The ratio is then changed into a direction opposite to the temperature difference in direct proportion to the difference. A pause of 20 minutes follows the change, and during this pause it is not possible to make a change in the same direction even if the temperature difference remained above or below the limit. Another change is made after the pause, if the temperature difference still deviates from the target. If not, then basic control is re-assumed. If the difference first deviates downward and then immediately upward, exceeding the acceptable limit, or vice versa, a change can be made to the reverse direction without pauses.

The drawings and the related specification are only meant to illustrate the idea of the invention. The details of the invention may vary within the claims. The blocks in the block diagrams of the Figures also illustrate devices that can be used for performing the operation of the blocks.

That which is claimed:

1. A method for controlling a causticizing process for producing white liquor from green liquor by feeding green liquor ($H_2O$, $Na_2CO_3$, and $Na_2S$) and lime (CaO) into a slaker to produce hydrated lime ($Ca(OH)_2$) according to the equation

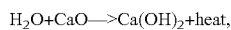
$$H_2O+CaO \longrightarrow Ca(OH)_2+heat,$$

causticizing the green liquor by reacting the hydrated lime and sodium carbonate ($Na_2CO_3$) within the green liquor to produce sodium hydroxide (NaOH) and calcium carbonate ($CaCO_3$) according to the equation

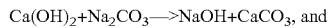
$$Ca(OH)_2+Na_2CO_3 \longrightarrow NaOH+CaCO_3, and$$

separating the calcium carbonate from the sodium hydroxide, the method comprising controlling the causticizing process by:

measuring the density of the green liquor being fed to the slaker;

controlling the density of the green liquor being fed to the slaker towards a set value with a density controller wherein green liquor density is controlled on the basis of a total titratable alkali by applying the following equation: D=(TTA+os)/kk, where D is the green liquor density; TTA is the total titratable alkali of the green liquor; os is an offset; and kk is a coefficient, wherein the coefficient is a constant angular coefficient having a value selected from between 0.9 and 1.4 when the unit used for expressing the TTA and the density is the same, the offset being determined on the basis of the model; and, specifying the set value by:
determining a target value for the total titratable alkali;
measuring the total titratable alkali in the green liquor being fed to the slaker;
providing a model that relates green liquor density to the measured total titratable alkali in the green liquor;
calculating the set value for green liquor density based on the measured total titratable alkali in the green liquor, the target value for the total titratable alkali, and the model; and,
updating the model by using the measurement result of the density and the measurement result of the total titratable alkali.

2. A method according to claim 1, wherein the causticizing process is controlled by applying a model describing the slaker.

3. A method according to claim 2, wherein the slaker is controlled on the basis of the difference between the slaker temperature and the green liquor temperature by adjusting the set value for the temperature difference control on the basis of the difference between the target causticity of lime milk and the causticity titration or titrations, the set value for the causticity being determined on the basis of the model describing the development of the causticity prevailing after the slaker to white liquor causticity.

4. A method according to claim 3, wherein the model in question is a static one and determines a causticity difference.

5. A method according to claim 4, wherein a quotient is calculated by dividing an average of the differences in white liquor and lime milk causticities by a causticity difference provided by the model on the basis of a production average, and the causticity difference produced by the model is multiplied by the quotient.

6. A method according to claim 5, wherein the average is calculated for a period of 2 to 40 hours.

7. A method according to claim 3, wherein the lime to green liquor ratio is controlled by adjusting the lime to green liquor ratio using the temperature difference control in such a way that when the measured temperature deviates from the temperature target, the lime to green liquor ratio target is changed in the opposite direction.

8. A method according to claim 7, wherein in connection with a production change, the lime to green liquor ratio is changed on the basis of a static model describing the changing of the lime to green liquor ratio during a production change.

9. A method according to claim 8, wherein the static model describing the changing of the lime to green liquor ratio during a production change substantially conforms with a production curve.

10. A method according to claim 1, wherein the offset is determined on the basis of the green liquor TTA and a momentary density of the green liquor by applying the model including the coefficient.

11. A method according to claim 1, wherein the model is specified by calculating averages for the variables used in the model.

12. A method according to claim 1, wherein after a sufficient green liquor flow and regular titrations for 1 to 40 hours, averages of desired variables calculated over 1 to 40 hours are used in the model.

13. A method for controlling a slaker within a causticizing process which comprises
(a) measuring the total titratable alkali within a green liquor inlet stream;
(b) determining the density of said green liquor inlet stream based on said total titratable alkali; and
(c) adjusting the density of said green liquor inlet stream, wherein the density of the green liquor inlet stream is determined using the following equation:

$$D=(TTA+os)/kk,$$

wherein:

D is the green liquor density;

TTA is the total titratable alkali of the green liquor;

os is an offset, which is determined using a model having as parameters the green liquor TTA and momentary density of green liquor; and kk is a constant angular coefficient, wherein the coefficient is a constant angular coefficient the value of which is between 0.9 and 1.4 when the unit used for expressing the TTA and the density is the same.

* * * * *